Sept. 4, 1956        D. F. MORSE ET AL        2,761,701
SEVERABLE DUCT JOINTS WITH PLURAL UNIVERSAL CONNECTIONS
Filed Sept. 11, 1951        3 Sheets-Sheet 1

INVENTORS.
DELBERT F. MORSE, DECEASED
BY LOUISE J. MORSE,
ADMINISTRATRIX,
CLIFFORD H. JENKINS

BY Reynolds, Beach & Christensen
ATTORNEYS

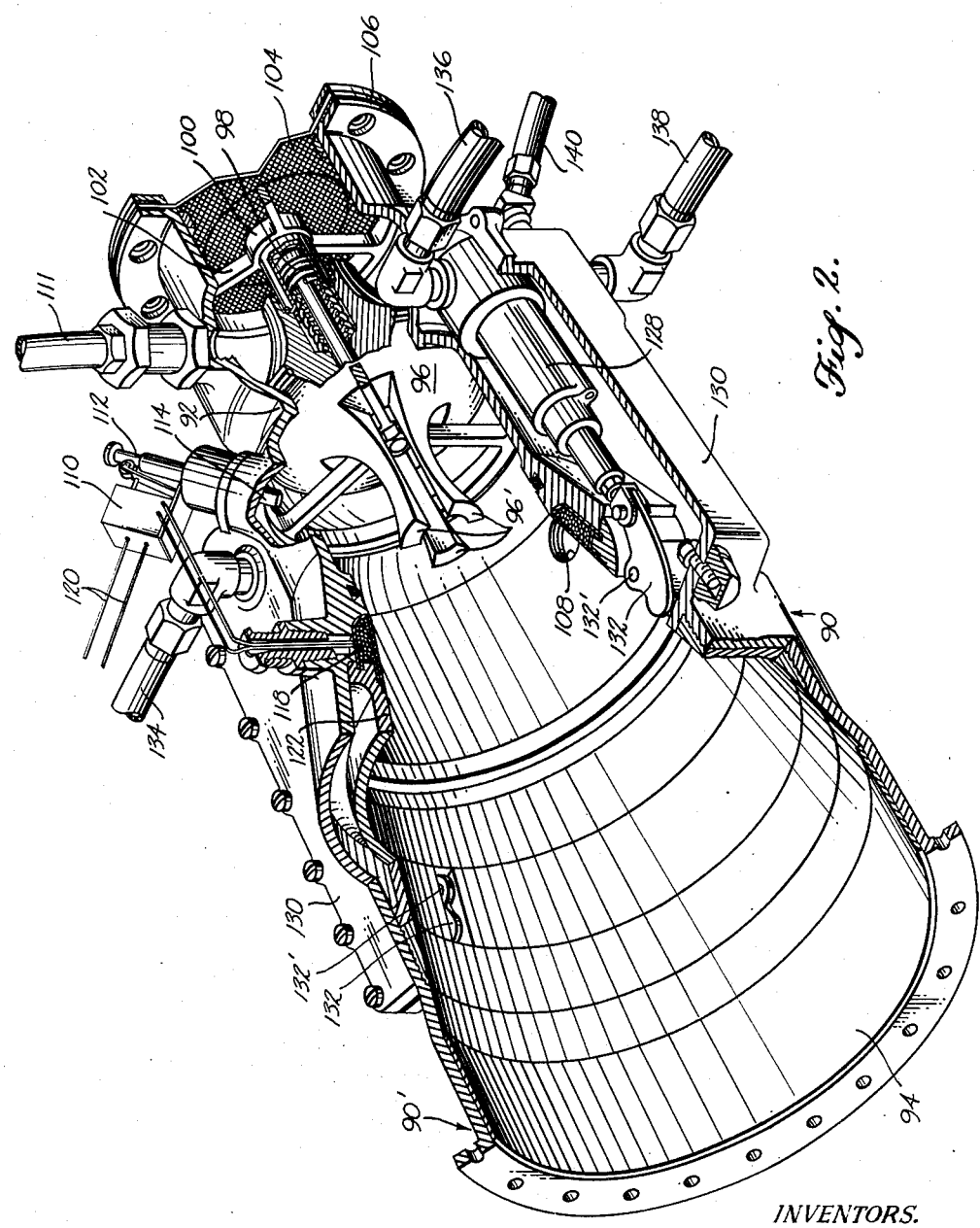

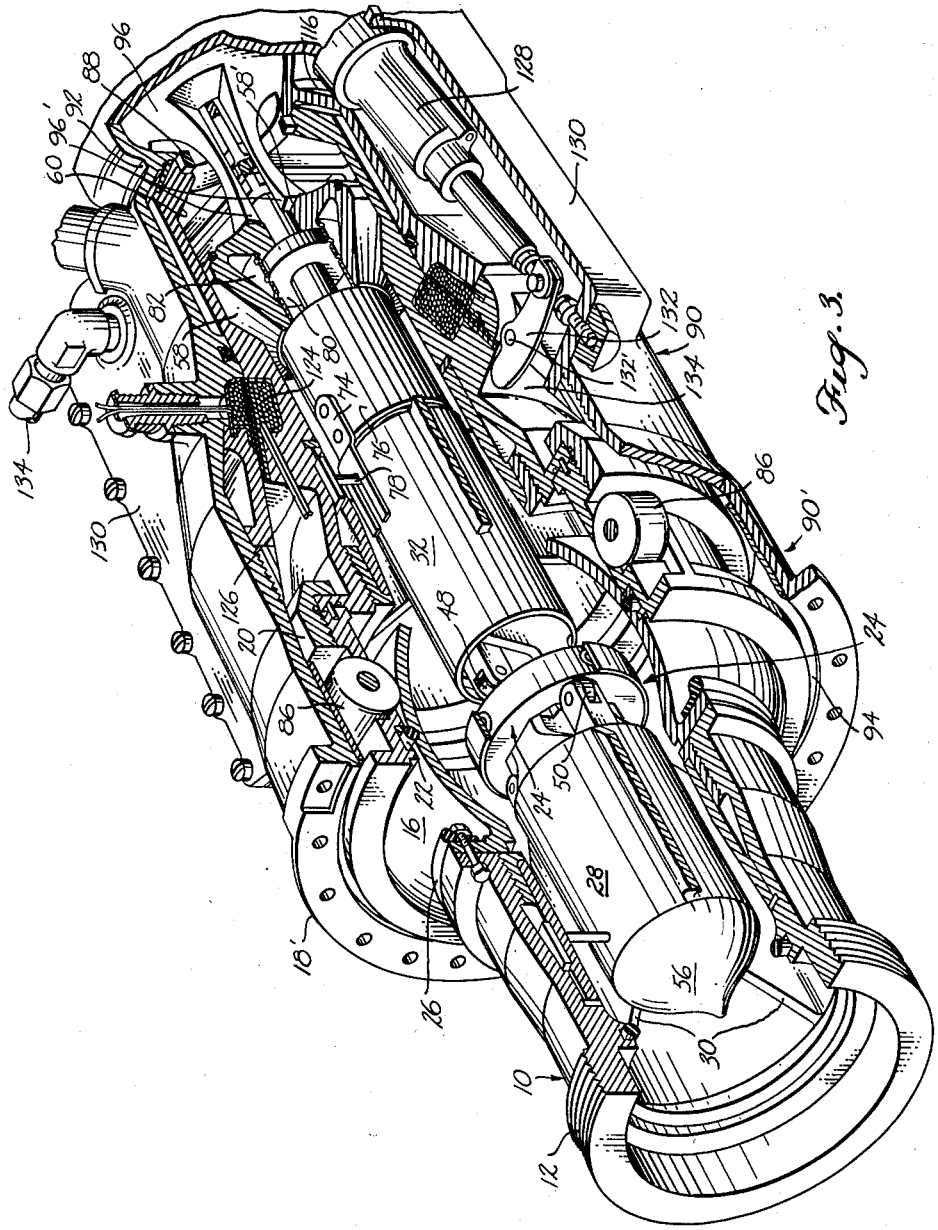

United States Patent Office 2,761,701
Patented Sept. 4, 1956

2,761,701

SEVERABLE DUCT JOINTS WITH PLURAL UNIVERSAL CONNECTIONS

Delbert F. Morse, deceased, late of Seattle, Wash., by Louise J. Morse, administratrix, Laconia, N. H., and Clifford H. Jenkins, Seattle, Wash., assignors to Boeing Airplane Company, Seattle, Wash., a corporation of Delaware Application September 11, 1951, Serial No. 246,142

6 Claims. (Cl. 285—164)

This invention relates to severable duct joints and is herein illustratively described by reference to its preferred application, namely as embodied in a nozzle and receptacle joint structure for the aircraft "flying boom" in-flight refueling system generally disclosed in Clifford J. Leisy Patent No. 2,663,523, issued December 22, 1953, and Patent No. 2,670,913, issued March 2, 1954, to Thomas Davis Castor, Clifford J. Leisy and William A. Sangster. It will be understood, however, that the invention may be employed elsewhere and is not necessarily limited to use in that type of system.

The in-flight refueling system mentioned above employs a "flying boom" which is trailed from the tanker airplane and establishes the fuel-transfer connection with a receiving airplane in need of fuel. Made up of telescoping sections, this boom is attached to the underside of the tanker airplane fuselage by a yoke and trunnion mount that permits swinging of the boom in elevation and azimuth. The receiving airplane is equipped with a receptacle usually located on top of its fuselage nose where it is most easily accessible to the nozzle on the trailing end of the boom. In preparation for a refueling contact the receiving airplane flies somewhat behind and below the tanker airplane. The boom operator in the tanker airplane then proceeds to "fly" the boom by controlling its air reaction surfaces, referred to as "ruddevators," in order to bring it into alignment with the receptacle on the receiving airplane. When such alignment is achieved the boom is extended in length until its nozzle enters the receptacle to complete the contact.

Because of the boom's universal support and telescoping features the fuel transfer connection is maintained throughout considerable variation in the positional relationship of the two airplanes and in the angularity of the boom relative to the tanker airplane. However, in order to permit inevitable variations in angularity of the receiving airplane relative to the boom as well, a universal coupling is also necessary at the nozzle-receptacle joint adjacent such airplane.

An object of the present invention is to provide a relatively compact and lightweight nozzle-receptacle duct joint permitting of such universal movement between boom and receiving airplane while maintaining a fluid-tight seal in such joint despite the substantial forces tending to produce misalignments and, further, despite the high pressure (in the vicinity of 50 pounds per square inch) under which the fuel may be pumped through the boom.

Another object is a rugged nozzle-receptacle duct joint of a form and construction which facilitates the insertion and removal of the nozzle into and from the receptacle with a minimum tendency of these components to bind or become damaged in the process. It is also a related purpose of the invention to provide such a joint wherein the universal coupling elements, herein illustratively described as being a part of the nozzle structure, are normally self-aligning, and are thereby properly oriented for direct insertion of the nozzle into the receptacle when the boom is flown into alignment with the receptacle.

Still another object of the invention is a severable duct joint having releasable holding means therein operable upon establishment of the nozzle-receptacle contact to hold nozzle and receptacle tightly together with a predetermined retaining force which is higher than the normal upper limit of tension permitted in the boom under refueling contact conditions, but below the maximum safe tension in the boom and structures interconnected thereby.

Still another object of the invention is valve mechanism incorporated in the nozzle and receptacle and automatically opened and closed as these joint components move into and out of engagement, respectively, such valves being actuated in a predetermined order so as to minimize spilling of fuel during formation and severance of the joint.

Described briefly, the severable duct joint achieving the foregoing and other objectives with reference to the in-flight refueling system, for instance, comprises a nozzle unit formed in two parts, one a coupling base and the other the nozzle proper, together constituting a generally tubular duct. These nozzle unit parts are joined together by a ball and socket duct connection which is such as to maintain a fluid-tight seal between such parts while permitting universal angular movement of the one relative to the other. So that the universal duct joint seal elements will not be disturbed and leak as a result of load forces, the ball and socket duct connection is not relied upon to withstand the heavy tension and compression stresses normally imposed on such a joint. These are borne instead by a separate universal coupling of the gimbal type mounted inside the nozzle unit concentrically with the outer ball and socket duct connection. An annular duct space is preserved around the interior coupling to permit passage of fuel through the nozzle.

Self-alignment of the universally movable nozzle unit parts when free of the receptacle is effected by yieldable spring-actuated aligning mechanism associated with the internal universal coupling. Such mechanism comprises in its preferred although not only form two sliding sleeves, one received in each side or base element of this universal coupling. Internal helical springs urge such sleeves respectively toward the gimbal ring, and cause diametrically opposite bearing elements, projecting endwise from each such sleeve, to engage the respectively opposite sides of the ring. The respective pairs of bearing elements lie in diametral planes perpendicular to each other, so that the forces of the two springs applied thereby to the gimbal ring in effect tilt it about both of its respective pivot axes into perpendicular relationship to the general axis of the nozzle. Hence, the nozzle proper cannot drop down or swing off to either side in relation to the nozzle coupling base, but remains aligned therewith when out of contact with the receptacle.

A nozzle valve, spring-seated inside the discharge end of the nozzle, normally closes off the nozzle passage, while a similarly situated receptacle valve under pressure of another spring normally closes the receptacle passage. While these valves may be opened and closed simultaneously without objectionable spillage of fuel, sequential operation is preferred. In the illustrated case, as the nozzle advances into the receptacle a group of fingers projecting outwardly from one such valve contact the end of the other valve such that as the nozzle continues to advance into the receptacle the valves are unseated, receptacle valve being first to open, as the nozzle valve spring force augmented by fuel pressure in the nozzle presents the stronger resistance to unseating. Only after the receptacle valve bottoms in open position, does the nozzle valve begin to unseat, but it reaches fully open position by the time the nozzle is fully inserted in the receptacle. When the nozzle is later withdrawn from the receptacle, the receptacle valve is last to close. This sequence of valve operations is such that spilling of fuel from the joint is minimized during formation and severance of the fuel transfer contact. Thus during formation of the severable joint fuel is not admitted into the joint until the receptacle valve is first opened to permit passage of such fuel freely into the receiving airplane fuel system and thereby minimize pressure rise in the joint. Likewise, during severance of the joint the receptacle valve is not closed until after flow through the boom nozzle is first cut off and opportunity is afforded for drainage of excess fuel from the joint through the still-open receptacle valve port into the fuel system of the receiving airplane.

Additional features of the joint structure contributing to its effectiveness in the example includes the provision of guide rollers steadying the nozzle laterally in relation to the receptacle as the valve approaches the fully inserted position therein, so that coacting parts which are to engage each other will be properly aligned before they actually come together and binding will be negligible. Upon establishment of firm contact of the nozzle in the receptacle, hydraulically operated latches on the receptacle are pressed against a should surface on the nozzle to hold the joint components tightly together while the boom is permitted to expand and contract within its own limits of operating strength. Pressure in the hydraulic jacks actuating such latches is maintained at a fixed value permitting withdrawal of the nozzle from the receptacle before the pull on the nozzle exceeds the maximum safe value in the system.

The foregoing and other features, objects and advantages of the invention, including preferred details of construction thereof, will become more fully evident from the following description based on the accompanying drawings, which illustrate the severable duct joint applied to the in-flight refueling system previously mentioned.

Figure 2 is a perspective view of the complemental receptacle unit with generally a quarter sector thereof broken away to show details.

Figure 3 is a perspective view corresponding to Figure 2 and with the nozzle unit fully inserted into the receptacle.

Figure 1:
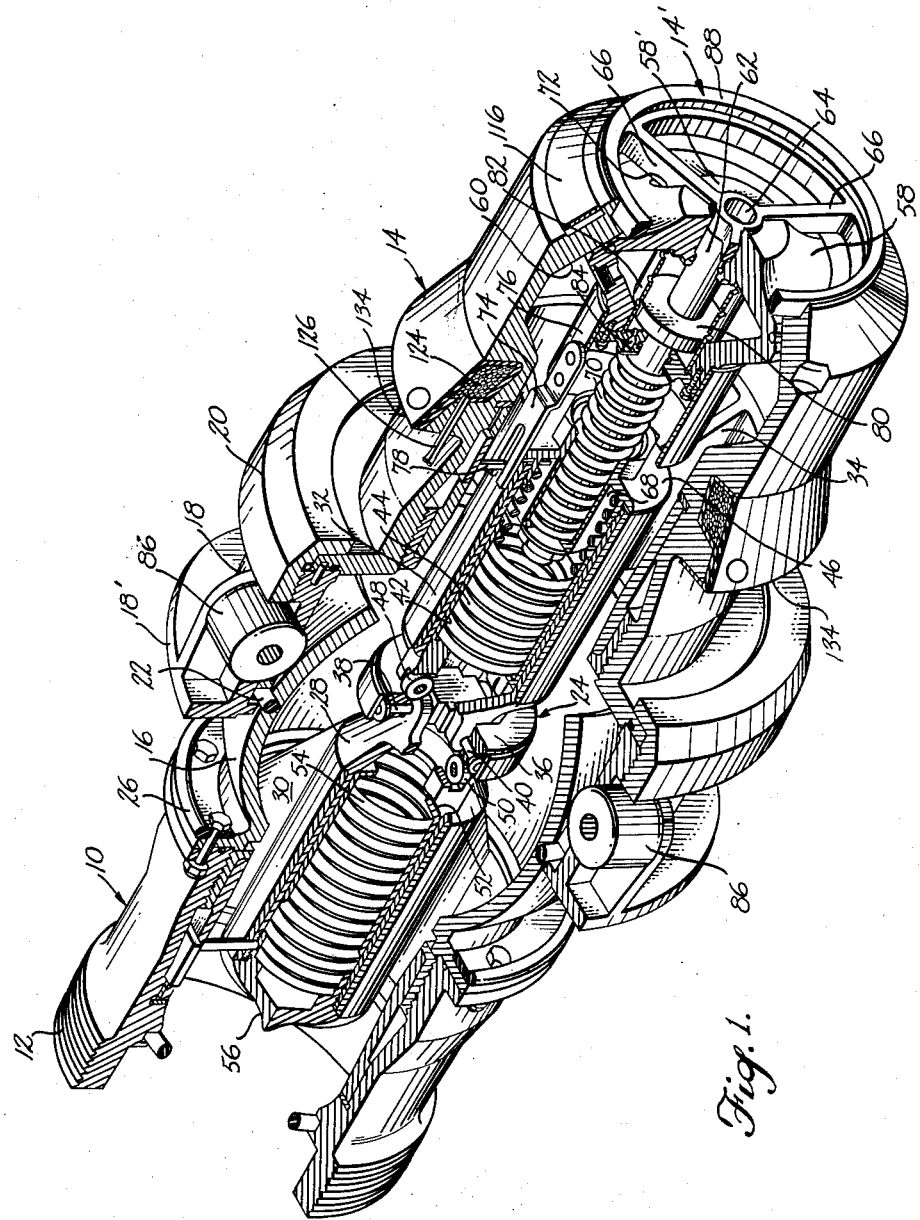
Figure 1 is a perspective view of the nozzle unit with generally a quarter sector thereof broken away to show internal details.

In general the nozzle unit comprises the nozzle proper or tip 14 and the coupling base 10 having screw threads on its end 12 for rigid attachment thereof to the trailing end of the refueling boom (not shown) carried by the tanker airplane. It is desirable when the nozzle unit of Figure 1 is fully inserted in the receptacle unit of Figure 2, as shown in Figure 3, that the refueling boom rigidly connected to the nozzle coupling base 10 be permitted to swing relative to the receptacle and receiving airplane without disturbing the fuel-transfer connection therebetween. Accordingly, a hollow ball joint fitting 16 is flange-connected to the coupling base 10 and is slidably received in the annular socket fitting 18 fixed on the adjacent end of the tubular nozzle proper 14 by a threaded retaining ring 20. A rubber O ring 22 in the socket 18 slides on the ball fitting 16 and forms a fluid-tight seal of the socket therewith, effective throughout universal pivoting movement of the nozzle proper 14 relative to the coupling base 10. This ball and socket universal duct connection between the nozzle unit base and nozzle proper is not required to transmit impact or tension loads through the nozzle unit, but only to maintain a sealed flexible duct joint. Loads of the character mentioned are assumed mainly by a separate universal coupling 24 mounted within the nozzle unit concentric to the ball and socket connection. A rubber bumper ring 26 on the flange of ball fitting 16 cushions any impact of such flange with the opposing flange 18' on the socket fitting 18 at the limits of pivoting of the universal joint. Ordinarily these limits are never reached, because the joint is severed before the boom swings to its limiting angle relative to the tanker airplane, which swinging necessarily accompanies or is accompanied by pivoting at the nozzle joint, as both airplanes tend to maintain level rectilinear flight during the refueling operation.

The internal universal coupling 24 of the nozzle unit comprises a tubular base element 28 supported in fixed position centrally of the coupling base 10 by radial fins 30, and a similar tubular base element 32 supported centrally within the nozzle proper 14 by radial fins 34. Located between the mutually adjacent ends of the base elements, the gimbal ring 36 is pivotally connected to the tubular base element 28 by diametral pivots 38 and to the opposing base element 32 by diametral pivots 40 disposed at right angles to the pivots 38, to form the universal coupling.

A sleeve 42 slidably received in the tubular base element 32 is urged endwise thereof toward the gimbal ring 36 by a helical spring 40 located inside the sleeve and reacting against the cover member 46 on the opposite end of the tube 32. While it is permitted to slide lengthwise of the tube 32, the sleeve 42 is appropriately keyed thereto by suitable means (not shown) so that it cannot rotate. Two bearing elements in the form of rollers 48 project endwise from the sliding sleeve 42 in diametrically opposite positions to contact the adjacent side of the gimbal ring 36 along a diameter thereof which is perpendicular to the pivot axis of the pivots 40. A similar pair of bearing elements 50 project in corresponding manner endwise from a sliding sleeve 52 received antirotationally in the tubular element 28 similarly to the sleeve 42 and, under force of a spring 54 reacting against the end cap 56 of the element 28, engage the adjacent side of the gimbal ring 36 along a diameter thereof perpendicular to the axis of pivots 38. The spring 54 acting through the oppositely disposed rollers 50 brings pressure to bear against the gimbal ring 36 tending to urge it into perpendicularity with the coupling base axis. The spring 44 acting through the oppositely disposed rollers 48 then brings the tubular base element 32 into perpendicularity with the gimbal ring.

Without some such self-aligning mechanism in the nozzle unit the nozzle proper 14 would tend to droop or swing off to the side in relation to the coupling base 10 and become difficult to insert in the receptacle under conditions facing the boom operator, who must establish the connection. Because of their ability to yield under appreciable forces tending to disturb the alignment of the nozzle components the springs naturally do not interfere with normal flexure of the nozzle unit when engaged in the receptacle. Moreover, the nozzle unit as a whole is made compact and rugged by imposing most of the mechanical load on the internal universal coupling, while preserving a relatively large annular space around it inside the nozzle for passage of fuel, so that the universal sealed connection around the nozzle exterior can have minimum girth and be of simplest form.

Fuel entering the nozzle unit through the coupling base 10 from the refueling boom is deflected with minimum turbulence and resistance losses by the streamlined cap 56 on the upstream end of the tubular universal coupling base element 28. Then flowing through the segmental spaces between radial vanes 30, the fuel enters the region immediately inside the ball fitting 16. It passes through this region without appreciable obstruction, because the gimbal ring 36 is not greatly, if at all, larger in diameter than the smooth cylindrical outer wall of the tubular base 28. Moreover, the bulging cavity of the ball fitting 16 more than compensates for any radial projection of the gimbal ring periphery beyond the outline of the tubular members 28 and 32. Thus the fuel is permitted to reach the discharge end 14' of the nozzle proper 14 with minimum resistance to flow in the nozzle.

A valve 58 of the poppet type normally closes the nozzle discharge opening by seating against the conically tapered inside end wall 60 of the nozzle. This valve slides longitudinally on the central guide shaft 62 between open and closed positions. The outer end of the shaft 62 is fixed to the hub 64 at the center of the spider 66 which extends across the nozzle discharge opening to prevent entry of foreign objects which might tend to damage the valve and impair its ability to seal. The inner end of the guide shaft 62 is supported by the end wall of the tubular socket 68 in cover member 46. The valve spring 70 received in this socket normally urges the valve into closed position, in which the radial notches 72 in its outer end face accommodate the radial arms of spider 66 to permit the flat central portion 58' of the valve to project endwise nearly to the transverse end plane of the nozzle for a purpose later to be explained. A slotted longitudinal guide 74 on the valve skirt 76 cooperates with a fixed radial pin 78 in the nozzle proper 14 to prevent rotational misalignment of the notches 72 from the spokes 76 when the valve is being moved out of and into seated position along guide shaft 62.

The hollow interior of the valve 58 constitutes a reservoir to contain a damping fluid used to prevent damagingly abrupt closure, when closure is permitted, of the valve 58 caused by the combined force of the valve return spring 70 and the high pressure of fuel urging the valve endwise toward seated position. Such abrupt closure of this valve is prevented by a piston element 80 fixed on the guide shaft 62 to be slidably contacted by a surrounding cylinder 82 fixed upon the inside of the valve. The peripheral wall of this cylinder is perforated to permit restricted flow of damping fluid between the spaces adjoining the respectively opposite ends of the piston during closure movement of the valve. The end walls of the valve itself constitute the end walls of the cylinder 82, that adjacent the spring 70 having a relief valve 84 of the ball type therein. This relief valve provides a metered escape of liquid from the cylinder during the final phase of the shock absorption stroke thereof relative to the piston, and a bleed port which, being located on the upper side of the guide shaft 64 permits escape of trapped air in the damping cylinder during the initial phase of such stroke. The amount of damping required is relatively small, to prevent a jarring closure of the valve, and does not delay closure so greatly that any appreciable amount of fuel is spilled from the nozzle-receptacle joint as a result thereof during the severance operation as later described.

It will be noted that the general shape of the nozzle unit as a whole, from the socket fitting 18 to the nozzle discharge end 14' is a generally symmetrically tapered form, uncluttered by any irregular projecting elements into the receptacle. Most of the functional mechanism of the nozzle unit, including the self-aligning universal coupling and the various components of the valve mechanism are internally located and are thus unobtrusive and shielded against damage.

With reference to Figure 2, it will be seen that the receptacle unit generally comprises a funnel-like shell 90 which tapers inwardly from its nozzle-receiving end portion 90' to a passageway or throat 92 which constitutes the seat of a receptacle valve 94. When the nozzle reaches the fully inserted position in the receptacle the primary nozzle seal 88 is firmly compressed against the outer face or lip of this throat and seals the joint.

The fuel entering the receptacle passes through a screen 104 supported by the mounting flange 106.

A wear-resistant cylindrical sleeve 94 lines the nozzle-receiving end portion 90' of the receptacle to assume impact wear and function as a guide surface for the guide rollers 86 mounted at spaced locations around the periphery of the socket fitting 18 of the nozzle. These rollers contact the liner sleeve 94 during the final stage of insertion movement of the nozzle into the receptacle and thereby have a steadying effect which insures proper alignment and registry of cooperating parts of the nozzle and receptacle, as well as minimizing friction and any tendency toward binding.

During the final stage of the nozzle's approach to seated position in the receptacle, the receptacle throat valve 96 is opened, followed immediately by opening of the nozzle valve 58 to permit flow of fuel into the receiving airplane. The fingers 96' project endwise from valve 96 toward the approaching end face 58' of nozzle valve 58 to be contacted thereby before the nozzle reaches fully inserted position. The receptacle valve 96 has a spring 98 which normally seats it against the inner lip of the receptacle throat 92 in the ordinary manner of a poppet valve. This spring is appreciably weaker than the combined force of nozzle valve spring 70 and the augmenting effect of fuel pressure in the nozzle. Thus upon impact of the fingers 96' with the valve end face 58' during the insertion movement of the nozzle the valve 96 is first to yield and open. When the receptacle valve 96 bottoms in fully open position against the hub 100 of a spider structure 102 located back of the receptacle throat, the nozzle valve 58 then opens and discharges fuel into and through the receptacle throat 92.

This sequential operation of the valves, which occurs in the reverse order, of course, when the nozzle is withdrawn from the receptacle, minimizes spillage of fuel in the joint during contact making and severance operations. Thus during the contact-making operation rise of fuel pressure in the joint tending to produce leakage is kept as low as possible by insuring that receptacle valve 96 is opened before fuel is admitted into the joint. By the same token, the joint seals are nearly fully engaged by the time the valve 96 commences to open. When the joint is broken by retraction of the nozzle any slight spillage of fuel resulting from the finite discharge past the nozzle valve in process of closing, largely flows into the receiving airplane fuel system, as the receptacle valve 96 is last to close. Any residue either runs out the drain opening 108 at the bottom of the receptacle for venting overboard from the airplane through suitable vent tubing (not shown), or is blown out of the receptacle unit by high pressure inert gas such as nitrogen blown into the receptacle through the purge line 111 located in its upper wall between the throat 92 and the flange 106. Other parts of the fuel system in the receiving airplane are also purged in order to minimize any possible danger of fire or explosion when refueling contact is being made or broken. In the actual system provision is also made for the injection of carbon dioxide gas at various points in the fuel system to blanket any flames which may occur.

An electric switch 110 mounted on the receptacle exterior is closed automatically by a cam 112 when the tip of a plunger 114 carrying such cam is contacted and pressed outwardly by the annular inclined striker face or shoulder 116 of the nozzle as the latter advances the final distance into firmly seated position in the receptacle. Closure of the switch establishes an energizing circuit (not shown) for the annular magnetic induction coil 118 through energizing leads 120, the coil being received in a grooved wall portion 122 of the tapering receptacle. The energizing circuit for the coil 118 is in the receiving airplane. The nozzle head carries a similar coil 124 at a location thereon such that it lies concentrically within the receptacle coil 118 when the nozzle is in the fully inserted position. Coil 124 has circuit leads 126 which extend along the refueling boom structure (not shown) to the tanker airplane. The magnetic field which is formed around the coil 118 as the switch 110 is closed passes through and links the windings of coil 124. A voltage impulse is thereby induced at that instant in the coil 124 which may be detected in the tanker airplane, while the causal surge of current in the coil 118 is detected in the receiving airplane. These simultaneous surges of voltage and current indicate in the respective airplanes the completion of the joint and, if desired, may be employed to trigger automatic or auxiliary apparatus to function in the refueling operation. Furthermore, during continuance of the connection these coils serve as a safe and reliable medium for transmission of electric signals through the boom structure between the airplanes without danger of explosions from electric arcing, as no electric contacts are used in the system subjected to liquid fuel or vapors.

A specific automatic operation which may be effected by an electric signal accompanying completion of the nozzle-receptacle joint, as above mentioned, is the actuation of hydraulic jacks 128 mounted in housings 130 on opposite sides of the receptacle shell 90. Nozzle-retaining latches 132 having intermediate pivots 132' are swung by these jacks from their retracted position, appearing in Figure 2, into their nozzle engaging position shown in Figure 3, wherein their inner ends engage the annular nozzle shoulder 134 to press the nozzle to its seat in the receptacle. Hydraulic pressure in the jacks creating holding force in the latches 132 may be established or regulated by well known techniques and is preferably selected at a value materially above that necessary to hold the nozzle in the receptacle against any normal tension force in the boom, but safely below the maximum permissive pull on the nozzle. Operation of the jacks is controlled by a suitable hydraulic system (not shown) communicating therewith through the supply pipes 136, the relief pipes 138 and the drain pipes 140.

In operation, the springs 44 and 54 acting through the pairs of bearing elements 48 and 50 maintain the gimbal ring 36 perpendicular to the axis of coupling base 10, hence hold the nozzle proper 14 aligned with such base for ready insertion into the receptacle by extension of the boom. The guide rollers 86 facilitate the insertion operation. As the nozzle advances into the receptacle, the latter's valve 96 is opened, following by opening of nozzle valve 58 by the time the primary seal 88 seats on the rim of the receptacle throat 92. When firm contact is thus established switch 110 is simultaneously actuated to close an energizing circuit for signal coil 118 which induces a voltage impulse in coil 124. Both airplanes are thus informed of the completion of contact, and the surge of current in coil 118 may be used for various purposes such as to initiate actuation of hydraulic jacks 128 and thereby close the nozzle-retaining latches 132. For breaking the connection the latches 132 may be independently released or their holding force overcome by pull on the nozzle unit effected through the boom, the latches releasing in that event before the safe stress in the joint structure is exceeded. During retraction of the nozzle, its valve is first to close. The receptacle valve closes last to permit spillage from the nozzle to drain into the receiving airplane fuel system.

We claim as our invention:

1. Fluid duct universal joint means interconnecting generally aligned duct members having substantially adjoining ends, comprising a load-bearing universal coupling situated internally of and between said duct members including first and second universal coupling base elements of materially smaller cross section than the interiors of said duct members, means internal to each of said duct members fixedly supporting said base elements generally centrally in the adjacent end portions of such duct members, respectively, while preserving fluid passage spaces therein around said base elements, cooperable universal coupling elements positively interconnecting said base elements and thereby said duct members, said universal coupling being constructed and arranged to permit universal relative angular movement therebetween while preventing relative bodily displacement therebetween in all directions, externally situated substantially non-load-bearing fluid-retaining universal joint means having joint-sealing portions interconnecting said adjacent ends of the respective duct members and arranged to permit slight relative bodily displacement therebetween and thereby prevent said fluid-retaining means from assuming appreciable mechanical load on said internally situated coupling tending to displace said duct members in any direction while freely permitting universal relative angular movement between said duct members, said external universal joint means and said internal universal coupling being so disposed relative one to the other that they have a substantially common center point of universal movement, said internally situated universal coupling cooperable element comprising gimbal means including a ring, spring means reacting between one of the coupling base elements and said gimbal ring normally maintaining such ring in predetermined angular relationship to said base element about one axis transverse to the surrounding duct member, and additional spring means reacting between the other coupling base element and said gimbal ring normally maintaining such ring in predetermined angular relationship to said latter base element about a transverse axis perpendicular to said first axis, said spring means being thereby subjected to progressively increasing stress by relative angular movement between said duct members out of position corresponding to the normal position of said gimbal ring.

2. The combination defined in claim 1, wherein the coupling base elements are of cylindrical form extending axially of the respective duct members and the spring means comprise helical springs arranged concentrically in relation to the respective cylindrical base elements.

3. In a fluid transfer duct system, the combination comprising a duct joint receptacle member adapted for connection to one fluid transfer duct, and a cooperable duct joint nozzle member insertable in said receptacle member adapted for connection to another fluid transfer duct, one of said members comprising first and second generally aligned tubular duct parts having substantially adjoining ends, only the first such duct part being connectable to the associated fluid transfer duct, and mechanical load bearing universal joint means interconnecting said duct parts contained wholly internally thereof, said joint means having a maximum cross section materially small than the interiors of said duct parts to permit passage of fluid freely through said duct parts in the space therein surrounding said joint means, said universal joint means including universally pivotally interconnected base elements and means rigidly supporting said base elements from said duct parts respectively, said universal joint means being constructed and arranged for preventing substantially all bodily displacement of one duct part relative to the other in any direction while permitting universal relative angular movement therebetween, means for releasably connecting said second duct part of the duct joint member rigidly to the other duct joint member, in fluid transfer relationship, and against appreciable relative movement therebetween in any direction, externally situated substantially non-load-bearing annular fluid-retaining means forming a universal fluid-tight seal between the adjacent ends of the respective duct parts, said fluid-retaining seal means being constructed and arranged to permit universal relative angular movement between said duct parts while being yieldable in a sense permitting slight relative bodily displacement between said duct parts without appreciably impairing the fluid tightness of such seal when subjected to lateral and longitudinal mechanical loads, whereby all such mechanical loads are borne principally by said universal joint means, said external universal seal means and said internal universal joint means being so disposed relative one to the other that all movements of each occur about a substantially common center point, said internally situated universal joint means comprising gimbal means including a ring, spring means reacting between one of the base elements and said gimbal ring normally maintaining such ring in predetermined angular relationship to said base element about one axis transverse to the surrounding duct part, and additional spring means reacting between the other base element and said gimbal ring normally maintaining such ring in predetermined angular relationship to said latter base element about a transverse axis perpendicular to said first axis, said spring means being thereby subjected to progressively increasing stress by relative angular movement between said duct parts out of position corresponding to the normal position of said gimbal ring.

4. The combination defined in claim 3, wherein the base elements are of cylindrical form extending axially of the respective duct parts and the spring means comprise helical springs arranged concentrically in the respective cylindrical base elements.

5. In a fluid transfer duct system, the combination comprising a duct joint receptacle member adapted for connection to one duct, and a cooperable duct joint nozzle member insertable in said receptacle member adapted for connection to another duct, one of said members comprising two generally aligned tubular duct parts having substantially adjoining ends, and mechanical load bearing universal joint means interconecting said parts contained wholly internally thereof, said joint means having a maximum cross section materially smaller than the interiors of said duct parts to permit passage of fluid freely through said duct parts containing said joint means, said universal joint means including universally pivotally interconnected base elements and means rigidly supporting said base elements from said duct parts respectively, said universal joint means being constructed and arranged for preventing substantially all mechanical displacement of one duct part relative to the other in any direction while permitting universal relative angular movement therebetween, and externally situated substantially non-load-bearing fluid-retaining means forming a universal seal between the adjacent ends of the respective duct parts, said fluid-retaining seal means being constructed and arranged to permit universal relative angular movement between said duct parts while being yieldable in a sence permitting slight relative bodily displacement between said duct parts when subjected to lateral and longitudinal mechanical loads, whereby all such mechanical loads are borne principally by said universal joint means, said internally situated universal joint means comprising gimbal means including a ring, and spring means reacting between one of the base elements and said gimbal ring normally maintaining such ring in predetermined angular relationship to said base element about one axis transverse to the surrounding duct part, and additional spring means reacting between the other base element and said gimbal ring normally maintaining such ring in predetermined angular relationship to said latter base elements about a transverse axis perpendicular to said first axis, said spring means being thereby subjected to progressively increasing stress by relative angular movement between said duct parts out of the position corresponding to the normal position of said gimbal ring, said base elements being of cylindrical tubular form extending axially of the respective duct parts, and said spring means comprising helical springs arranged concentrically in the respective base elements, each such spring means including a plunger longitudinally slidably engaged with the associated base element and having thereon bearing elements projecting in diametrically opposite positions from said plunger into contact with the adjacent side of the gimbal ring, the associated helical springs reacting from the respective base elements to urge said plunger bearing elements into contact with the adjacent sides of such gimbal ring under spring pressure.

6. Fluid duct universal joint means interconnecting generally aligned duct members having substantially adjoining ends, comprising an internally situated load-bearing universal coupling between said duct members including first and second universal coupling base elements of materially smaller cross section than the interiors of said duct members, means internal to each of said duct members fixedly supporting said base elements generally centrally in the adjacent end portions of such duct members, respectively, while preserving fluid passage spaces therein around said base elements, and cooperable universal coupling elements positively interconnecting said base elements and thereby said duct members, said universal coupling being constructed and arranged to permit universal relative angular movement therebetween while preventing relative bodily displacement therebetween in all directions, and externally situated substantially non-load-bearing fluid-retaining universal joint means having joint-sealing portions interconnecting said adjacent ends of the respective duct members and arranged to permit slight relative bodily displacement therebetween and thereby prevent said fluid-retaining means from assuming appreciable mechanical load on said internally situated coupling tending to displace said duct members in any direction while freely permitting universal relative angular movement between said duct members, said internally situated universal coupling cooperable elements comprising gimbal means including a ring, and spring means reacting between one of the coupling base elements and said gimbal ring, normally maintaining such ring in predetermined angular relationship to said base element about one axis transverse to the surrounding duct member, an additional spring means reacting between the other coupling base element and said gimbal ring normally maintaining such ring in predetermined angular relationship to said latter base element about a transverse axis perpendicular to said first axis, said spring means being thereby subjected to progressively increasing stress by relative angular movement of said duct members out of position corresponding to the normal position of said gimbal ring, said coupling base elements being of cylindrical tubular form extending axially of the respective duct members, and the spring means comprising helical springs arranged concentrically in relation to the respective cylindrical base elements, each such spring means further including a plunger longitudinally slidably engaged with the associated base element and having thereon bearing elements projecting in diametrically opposite positions from such plunger into contact with the adjacent side of the gimbal ring, the associated helical springs reacting from the respective base elements to urge said plunger bearing elements into contact with the adjacent sides of such gimbal ring under pressure.

References Cited in the file of this patent

UNITED STATES PATENTS

| Number | Name | Date |
|---|---|---|
| 169,659 | Rankin | Nov. 9, 1875 |
| 950,665 | Forth | Mar. 1, 1910 |
| 979,513 | Koenig | Dec. 27, 1910 |
| 996,156 | Spicer | June 27, 1911 |
| 1,748,817 | Zerk | Feb. 25, 1930 |
| 1,848,372 | Moran | Mar. 8, 1932 |
| 1,853,171 | Nettenstrom | Apr. 12, 1932 |
| 1,984,347 | Sutton | Dec. 11, 1934 |
| 2,096,444 | Arvintz | Oct. 19, 1937 |
| 2,199,588 | Cobham et al. | May 7, 1940 |
| 2,401,674 | Vizay | June 4, 1946 |
| 2,486,113 | Campbell | Oct. 25, 1949 |
| 2,499,569 | Cooley | Mar. 7, 1950 |
| 2,634,926 | Worlidge | Apr. 14, 1953 |
| 2,634,927 | Smith | Apr. 14, 1953 |

FOREIGN PATENTS

| 718,647 | France | Nov. 5, 1931 |